United States Patent [19]

Kirchgessner et al.

[11] Patent Number: 5,135,729

[45] Date of Patent: * Aug. 4, 1992

[54] LIGNOSULFONATE-MODIFIED CALCIUM HYDROXIDE FOR SO₂ CONTROL DURING FURNACE INJECTION

[75] Inventors: David A. Kirchgessner, Chapel Hill, N.C.; Jeffrey M. Lorrain, Tampa, Fla.

[73] Assignee: United States of America Environmental Protection Agency, Research Triangle Park, N.C.

[ * ] Notice: The portion of the term of this patent subsequent to Nov. 22, 2005 has been disclaimed.

[21] Appl. No.: 503,828

[22] Filed: Apr. 3, 1990

Related U.S. Application Data

[60] Continuation-in-part of Ser. No. 400,359, Aug. 30, 1989, abandoned, which is a continuation-in-part of Ser. No. 230,585, Aug. 9, 1988, Pat. No. 4,882,309, which is a division of Ser. No. 930,689, Nov. 12, 1986, Pat. No. 4,786,485.

[51] Int. Cl.⁵ .............................................. B01J 20/22
[52] U.S. Cl. ................................... 423/244; 502/401; 423/242
[58] Field of Search ......................... 423/244 A, 242 A

[56] References Cited

U.S. PATENT DOCUMENTS 4,786,485 11/1988 Kirchgessner et al. ........ 423/244 A

*Primary Examiner*—Patrick P. Garvin
*Attorney, Agent, or Firm*—Heller, Ehrman, White & McAuliffe

[57] ABSTRACT

A method is provided for removing sulphur-containing gases from fossil fuel-fired combustors comprising the step of introducing sorbent particles modified with lignosulfonates into the exhaust gases.

4 Claims, 1 Drawing Sheet

LIGNOSULFONATE-MODIFIED CALCIUM HYDROXIDE FOR SO₂ CONTROL DURING FURNACE INJECTION

This is a continuation-in-part of copending Ser. No. 400,359, filed Aug. 30, 1989 and now abandoned, which is a continuation-in-part of Ser. No. 230,585, filed Aug. 9, 1988 and now U.S. Pat. No. 4,882,309, which is a division of Ser. No. 930,689, filed Nov. 12, 1986, now U.S. Pat. No. 4,786,485.

The present invention is directed to a method for removing sulphur-containing gases from the exhaust gases of a fossil fuel-fired combustor. In particular, the present method provides for removing sulphur-containing gases by introducing particulate surfactant-modified sorbent downstream of the flame zone of the combustor.

BACKGROUND OF THE INVENTION

Relatively costly methods exist for control of sulphur oxide pollution from fossil fuel-fired combustors, but they are most commonly applied to new facilities where the expense and control of the technology is justifiable due to the long remaining depreciable lifetime of the facility. There is a large population of older combustors in existence for which the cost-effective methods of reducing sulphur oxide emissions are not generally available due to the substantial additional capital expense which would need to be expended on an old facility. There is a need, therefore, to develop cost-efficient, retrofittable technology to control sulphur oxides and nitrogen oxides in this population of older plants.

In other methods, inorganic promoters have been added to each of the calcium-based sorbents in an effort to increase their reactivity. Promoters can increase reactivity significantly but each group of effective promoters has problems which preclude it from practical application. Transition metals such as chromium are effective in various forms but they are relatively expensive and may produce environmental side effects of their own. Alkali metal additives are aggressive promoters during natural gas-firing, but are condensed on the ash which is produced during coal-firing and are unavailable to promote $SO_2$ capture by the sorbent. There remains a need in the art, therefore, for a sorbent with an improved capability of capturing $SO_2$ that will not be depleted by ash interactions in a coal-fired combustor, and which does not introduce detrimental environmental effects.

It is thus an object of the present invention to provide a method for removing sulphur-containing gases, particularly sulphur oxides, from the exhausts of fossil fuel-fired combustors.

It is also an object of the present invention to provide an improved sorbent for removing sulphur oxides from the exhaust gases of fossil fuel-fired combustors when said sorbent is injected into, or downstream from the combustor.

These and other objects of the present invention will be apparent from the following description and appended claims.

SUMMARY OF THE INVENTION

Figure 1:
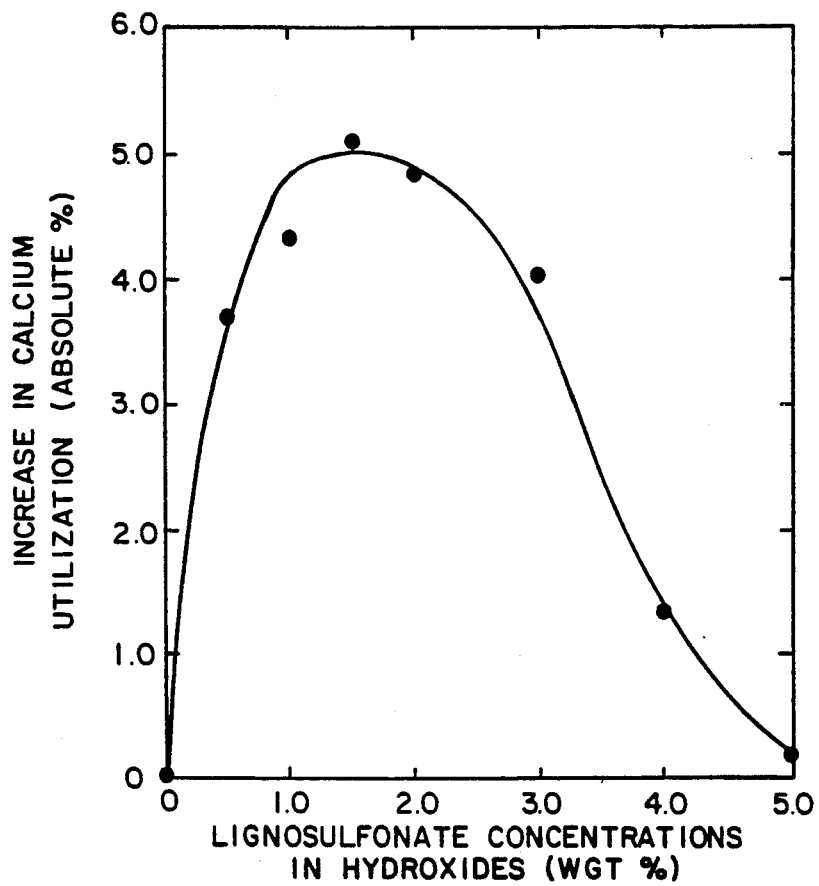
FIG. 1 is a graph of the amount of increase in calcium utilization (over unmodified control sorbent) in the sorbent utilized in accordance with the present invention versus the amount of lignosulfonate concentration in the sorbent.

The present invention provides a method for removing sulphur-containing gases from exhaust gases of fossil fuel-fired combustors comprising the step of introducing into the exhaust gases at a temperature in the range of about 65°–1315° C. sorbent particles capable of reacting with sulphur oxides wherein the particles comprise calcium hydroxide or calcium magnesium hydroxide and an ionic surfactant. The surfactant is preferably an alkali metal lignosulfonate. The sorbent preferably comprises 0.5 to 2 percent by weight calcium lignosulfonate but may contain up to 5 percent by weight calcium lignosulfonate, and is characterized by a significantly finer particle size distribution than the equivalent sorbent without lignosulfonate.

DESCRIPTION OF THE PREFERRED EMBODIMENT

To practice the method according to the present invention, a surfactant-modified sorbent is prepared. The preferred surfactant is an alkali metal lignosulfonate. The sorbent is selected from the group consisting of calcium magnesium hydroxide [$Ca(OH)_2 \cdot Mg(OH)_2$] and calcium hydroxide [$Ca(OH)_2$].

Initially, limestone ($CaCO_3$) or dolomite [$CaMg(CO_3)_2$] is calcined to its respective oxide (CaO or CaO.MgO), usually in the temperature range of 900° to 1100° C. (lime temperature) but preferably at around 1000° C. This produces a soft-burned lime characteristic of that available at commercial lime plants. The resulting oxide is then hydrated at a water to oxide ratio ranging from about 1.3 to 2.2 but preferably around 1.8 to 2.0, with water containing the desired amount of calcium lignosulfonate or other ionic surfactant. The amount of calcium lignosulfonate utilized will be that sufficient to produce a resulting calcium hydroxide/calcium lignosulfonate product containing up to about 5 percent by weight calcium lignosulfonate. Preferably, the resulting product will contain about 0.5 to 2 percent calcium lignosulfonate.

The calcium lignosulfonate-modified calcium hydroxide sorbent according to the present invention results in a higher capture of $SO_2$ than an unmodified calcium hydroxide when injected into a fossil fuel-fired combustor or combustor flue system. Typically the modified sorbent will be injected into the flue where the exhaust gases are at a temperature in the range of about 65° to 1315° C. Since the improved performance is the result of a physical rather than a chemical change, the tendency of coal ash to remove the enhancement is avoided.

The lignosulfonate-modified sorbents are also improved in that they have improved handling characteristics. Commercial hydrates frequently have the tendencies to cake and agglomerate during storage and handling which cause problems at their point of use. The lignosulfonate-modified sorbents according to the present invention are characterized by a reduced amount of caking during storage and reduced amount of agglomeration during handling, thus facilitating handling and controllability of fluidization during feeding to the reactor or combustor.

While not intending to be bound to any particular theory of operation of the present invention, it is believed that the surfactant-modified sorbents according to the present invention exhibit these improved properties, at least in part, because of formation of smaller calcium hydroxide particles. Smaller particles are formed in two ways: (1) during the hydration reaction, surfactant decreases the surface energy of the nucleus/solution interface (surface tension) and thereby increases the nucleation rate. This results in a large number of small crystals rather than a small number of large crystals; (2) the tendency of small calcium hydroxide crystals to form larger particles through agglomeration is reduced by eliminating the layer of adsorbed water which surrounds such crystals. This is accomplished by introducing a hydrophobic surfactant layer around the crystals. Thus, both an increase in nucleation rate during the hydration reaction, and a decrease in adsorbed water by enhanced by hydrophobicity of crystal surfaces are effected by a small quantity of lignosulfonate.

It is also believed that the surfactant-modified sorbents according to the present invention exhibit these improved properties because the calcium lignosulfonate retards the solid state diffusion process of sintering in the sorbent. The process of sintering in unmodified sorbents quickly removes the internal surface area and porosity which are necessary for high levels of reactivity with sulfur oxides.

Having described the preferred embodiment of the present invention the following examples are provided for purposes of illustration. However, the examples are not intended to limit the invention in any way.

EXAMPLE 1

A commercially available limestone, Presque Isle, was calcined to calcium oxide at 1000° C. for 16 hours. A chemical analysis of the resulting lime showed no significant quantities of known inorganic promoters. The resulting calcium oxide was then hydrated at a water to calcium oxide ratio of 2.6 with water containing varying amounts of calcium lignosulfonate. The amounts of the calcium lignosulfonate surfactant in the water were calculated to yield 0, 0.5, 1.0, 1.5, 2.0, 3.0, 4.0, and 5.0% of calcium lignosulfonate in the product calcium hydroxide. The modified calcium hydroxides were then tested for reactivity with sulphur dioxide in a laboratory scale isothermal flow reactor in which the reactor temperature was held at 1000° C., the residence time for the reaction was 1 second, and the sulphur dioxide concentration was 3000 ppm. These are conditions within the range of those which would be encountered during downstream injection of a sorbent for $SO_2$ capture in a coal-fired boiler. The increased calcium utilization by the sorbent-containing calcium lignosulfonate over the control sorbent (containing no surfactant) are shown in FIG. 1. At the optimum calcium lignosulfonate concentrations in the hydroxide (1.5 to 2.0 weight percent), calcium utilization increases of approximately 5% absolute (20 to 25% relative) is achieved. With calcium to sulphur ratio of 2 and $SO_2$ capture of over 60% is calculated.

EXAMPLE 2

Figure 2:
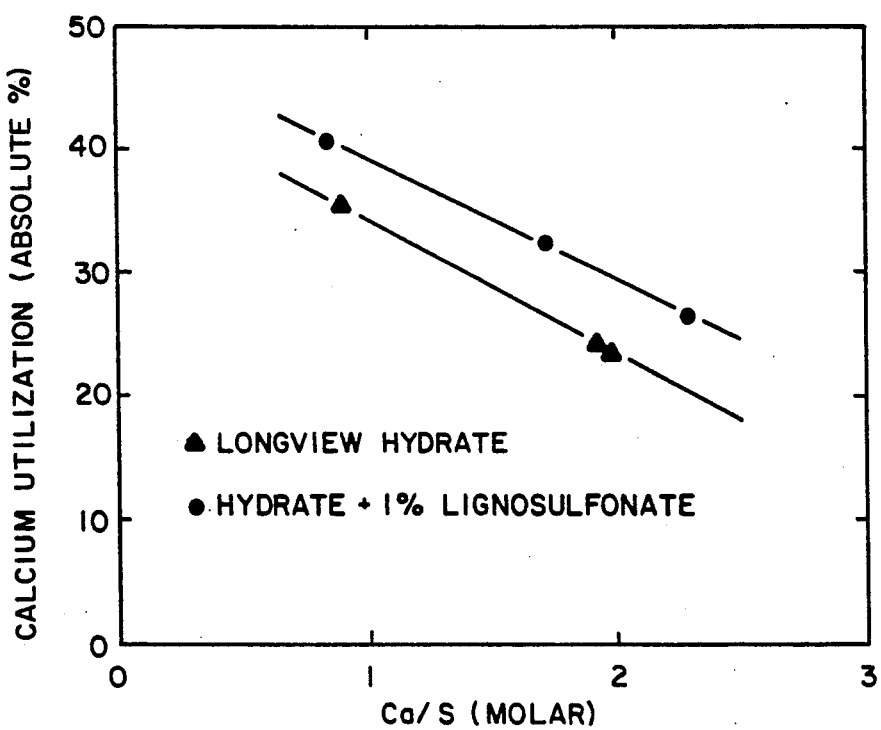
FIG. 2 is a graph showing the comparison in the amounts of calcium utilization versus the calcium/sulphur ratio in two sorbents, with and without the improvement according to the present invention.

Two sorbents were produced for testing in a pilot-scale, coal-fired combustor. The control sorbent was commercial Longview calcium hydroxide. The modified sorbent was made from commercial Longview calcium oxide, experimentally hydrated with water containing calcium lignosulfonate to produce a hydroxide containing 1% calcium lignosulfonate. The sorbent was then injected into a $10^6$ Btu, coal-fired furnace at 1250° C. The resulting calcium utilizations of the control and modified sorbents are shown in FIG. 2. A 20 to 25% relative increase in calcium utilization by the modified sorbent is shown.

What is claimed is:

1. A method for removing sulphur-containing gases from exhaust gases of a fossil fuel-fired combustor comprising the steps of introducing into said exhaust gases at a temperature in the range of about 65° to 1315° C. sorbent particles capable of reacting with said sulphur containing gases, said particles comprising a surface-modified sorbent selected from the group consisting of alkali metal lignosulfonate-modified calcium hydroxide and alkali metal lignosulfonate-modified calcium magnesium hydroxide, wherein said alkali metal lignosulfonate comprises up to 5% by weight of the total dry weight of said surface-modified sorbent.

2. The method according to claim 1 wherein said sorbent comprises calcium hydroxide and said surfactant comprises calcium lignosulfonate.

3. A method according to claim 2 wherein said particles comprise from 0.5 to 2% calcium lignosulfonate.

4. A method according to claim 3 wherein the particle size distribution of said particles is finer than the distribution of a corresponding non-surfactant modified sorbent.

* * * * *